United States Patent Office 3,451,953
Patented June 24, 1969

3,451,953
HYDROPHILIC POLYURETHANE FOAMS FROM ALCOHOL ALDEHYDES
Joerg Sambeth and Alexis Archipoff, Carouge, Geneva, and Jean Pierre Godechot, Geneva, Switzerland, assignors to Elekal, Paris, France
No Drawing. Filed Nov. 28, 1966, Ser. No. 597,237
Claims priority, application Switzerland, Nov. 27, 1965, 16,354/65
Int. Cl. C08g 22/44, 22/16
U.S. Cl. 260—2.5    5 Claims

ABSTRACT OF THE DISCLOSURE

This specification discloses hydrophilic polyurethane foams. The foams are prepared by reacting a hydroxy containing aldehyde with the ingredients conventionally used to prepare polyurethane foams.

---

This invention relates to hydrophilic polyurethane foams and a method for making same.

The hydrophilic polyurethane foams provided by the present invention comprises the reaction products of at least one organic polyisocyanate, at least one polyester or polyether based polyol, water, and at least one alcohol aldehyde.

As is known, polyurethane foams generally consist of the reaction products of at least one organic polyisocyanate with at least one polyester or polyether based polyol and the reaction products of said organic polyisocyanate with water.

Such known polyurethane foams have, however, a distinctly hydrophobic nature thereby restricting, inter alia, their industrial or household use for sponging purposes, since they cannot by mere contact sponge a moist surface.

The foams provided by the present invention are highly hydrophilic in nature since they further comprise the addition products of at least one alcohol aldehyde with said organic polyisocyanate. They thus comprise structural units having the following formulae:

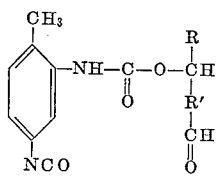

and

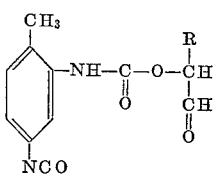

wherein R is a hydrogen atom or an aliphatic chain and R' is an aliphatic chain or a heterocyclic group.

The polyurethane foams of the present invention are produced by direct synthesis, according to a method which comprises reacting at least one organic polyisocyanate at ambient temperature and in the presence of water, a catalyst and at least one surface active agent, with at least one polyester or polyether based polyol and with at least one alcohol aldehyde.

The method thus consists of using for the synthesis of the foam, in addition to the usual starting substances, which are the polyisocyanates and the polyols, at least one alcohol aldehyde.

The function of the latter, which is a hydrophilic derivative, is to react with the polyisocyanate through its hydroxyl group, while keeping its aldehyde group free, thereby imparting to the foam hydrophilic properties.

To this end, use is preferably made with at least one derivative of the general formula:

R—CHOH—R'—CHO wherein R is hydrogen or an aliphatic group and R' is an aliphatic group or a heterocyclic group. Thus, use may for instance be made of aldol wherein:

R=CH$_3$ and R'=CH$_2$ or ω-hydroxymethyl-furfural, which has the formula

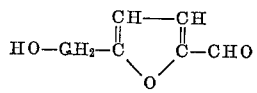

Thus, in the above general formula, R=H and

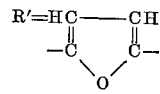

As regards the amount of aldol to be used, the best results are obtained with a quantity of aldol lying between 1 and 10 parts by weight per part of polyol.

Use can also be made of at least one derivative of the general formula

R—CHOH—CHO wherein R is ether hydrogen or an aliphatic group.

A suitable derivative of this type would, for instance, be hydroxyacetaldehyde.

As for the catalysts, use is preferably made of those catalysts resorted to in the known methods of making polyurethane foams. The same applies to the surface active agents for stabilizing the foam. For this purpose, use can be made of silicone oils consisting of polyalkyleneoxide polyorganosiloxane copolymers. Moreover, dimethylsilicones can be used by way of macro-structural agents for imparting to the foams the appearance of a natural sponge.

The above described method may be example be practised as follows:

Example 1

An intimate mixture of:

| | Parts |
|---|---|
| Polypropylene glycol (M=2100) | 98 |
| Aldol | 2 |
| Total water | 3.5 |
| Toluylene diisocyanate, TDI index 105. | |
| Silicone oil | 2 |
| Dimethyl silicone | 0.015 |
| Triethylene diamine | 0.15 |
| Stannous octoate | 0.1 | is prepared by stirring at ambient temperature and the mixture is then poured into a mold and left to foam.

The foam thus produced has outstanding hydrophilic properties which were ascertained by:

(1) A conventional method which consists is determining the wetting time of a sponge (2-3 seconds for a sponge of usual size);

(2) A conventional method which consists in measuring the wiping properties of a sponge: the wiping efficiency reaches and exceeds 85%.

Example 2

The procedure is the same as in Example 1, but instead of aldol, 2 parts of hydroxy-acetaldehyde are used.

Example 3

The procedure is the same as in Example 1, but instead of 2 parts of adol, 4 parts of ω-hydroxymethyl-furfural are used.

Example 4

The procedure is the same as in Example 1, but instead of 2 parts of aldol, 5 parts of aldol are used.

Example 5

The procedure is the same as in Example 1, but using 7 parts of aldol.

Example 6

The procedure is the same as in Example 1, but using 10 parts of aldol.

We claim:

1. A hydrophilic polyurethane foam prepared by reacting (i) at least one organic polyisocyanate, (ii) at least one polyol selected from the group consisting of polyethers and polyesters, (iii) water, and (iv) an alcohol aldehyde of the formula R—CHOH—R'—CHO or R—CHOH—CHO wherein R is hydrogen or an aliphatic group and R' is an aliphatic group or a heterocyclic group.

2. The hydrophilic polyurethane foam of claim 1 wherein said alcohol aldehyde is of the formula

R—CHOH—R'—CHO and wherein R is hydrogen or methyl and R' is —CH$_2$— or

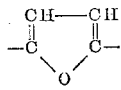

3. The hydrophilic polyurethane foam of claim 1 wherein said alcohol aldehyde is of the formula

R—CHOH—CHO wherein R is hydrogen.

4. The hydrophilic polyurethane foam of claim 1 wherein said organic polyisocyanate is toluylene diisocyanate.

5. The hydrophilic polyurethane foam of claim 1 wherein said polyether is a polypropylene glycol having a molecular weight of about 2100.

References Cited

UNITED STATES PATENTS

| | | | |
|---|---|---|---|
| 3,137,661 | 6/1964 | Rose et al. | 260—2.5 |
| 3,149,000 | 9/1964 | Beicos | 117—98 |

FOREIGN PATENTS

| | | |
|---|---|---|
| 411,336 | 11/1966 | Switzerland. |
| 417,084 | 1/1967 | Switzerland. |
| 924,081 | 4/1963 | Great Britain. |
| 1,043,509 | 9/1966 | Great Britain. |
| 1,210,555 | 2/1966 | Germany. |
| 1,399,243 | 4/1965 | France. |

DONALD E. CZAJA, *Primary Examiner.*

M. B. FEIN, *Assistant Examiner.*